(12) United States Patent
Arsoski et al.

(10) Patent No.: US 12,012,812 B2
(45) Date of Patent: Jun. 18, 2024

(54) DUAL FLOW CONVERTED AUTO-FILL FLOAT VALVE

(71) Applicant: DOWNHOLE PRODUCTS LIMITED, Aberdeen (GB)

(72) Inventors: Darko Arsoski, Angus (GB); Alexander Craig Mackay, Aberdeen (GB)

(73) Assignee: DOWNHOLE PRODUCTS LIMITED

( * ) Notice: Subject to any disclaimer, the term of this patent is extended or adjusted under 35 U.S.C. 154(b) by 171 days.

(21) Appl. No.: 17/865,658

(22) Filed: Jul. 15, 2022

(65) Prior Publication Data

US 2023/0069930 A1    Mar. 9, 2023

Related U.S. Application Data (60) Provisional application No. 63/241,248, filed on Sep. 7, 2021.

(51) Int. Cl.
*E21B 34/08* (2006.01)
*E21B 21/10* (2006.01)
*E21B 33/14* (2006.01)
*F16K 1/38* (2006.01)
*F16K 15/02* (2006.01)
*F16K 27/02* (2006.01)

(52) U.S. Cl.
CPC ............. *E21B 21/10* (2013.01); *E21B 33/14* (2013.01); *E21B 34/08* (2013.01); *F16K 1/38* (2013.01); *F16K 15/026* (2013.01); *F16K 27/0209* (2013.01)

(58) Field of Classification Search
CPC .......... E21B 17/14; E21B 21/10; E21B 34/10; E21B 34/102; E21B 34/08; F16K 1/38; F16K 15/026; F16K 27/0209
See application file for complete search history.

(56) References Cited

U.S. PATENT DOCUMENTS

| | | | |
|---|---|---|---|
| 3,051,246 A | | 8/1962 | Clark |
| 3,385,370 A | * | 5/1968 | Knox ...................... E21B 21/10 137/515 |
| 3,385,372 A | | 5/1968 | Knox |

(Continued)

FOREIGN PATENT DOCUMENTS

EP         533369 A1 *  3/1993  ............. E21B 21/10

OTHER PUBLICATIONS

Extended European Search Report and Opinion for EP App No. 22187190.8 and dated Dec. 15, 2022.

*Primary Examiner* — Jennifer H Gay (57) ABSTRACT

A flow-actuated valve for use in a wellbore includes: a body; a poppet movable relative to the body between an open position and a closed position; a spring biasing the poppet toward the closed position; and a shifter having a drogue and a detent engaged with a detent profile of the poppet and a locking receptacle of the body when in an auto-fill mode, thereby keeping the poppet in a partially open position. The valve is operable to shift to a float mode in response to a first flow rate moving the poppet toward the open position to disengage the detent from the locking receptacle and a second flow rate imparting a drag force on the drogue sufficient to disengage the detent from the detent profile. The second flow rate is different than the first flow rate.

15 Claims, 6 Drawing Sheets

(56) References Cited

U.S. PATENT DOCUMENTS

| | | | | |
|---|---|---|---|---|
| 3,776,250 | A * | 12/1973 | Knox | F16K 17/0426 |
| | | | | 137/71 |
| 4,067,358 | A * | 1/1978 | Streich | E21B 23/006 |
| | | | | 137/515 |
| 4,625,762 | A * | 12/1986 | Hassanzadeh | E21B 21/10 |
| | | | | 137/75 |
| 4,683,955 | A * | 8/1987 | Stepp | E21B 21/10 |
| | | | | 166/326 |
| 5,411,049 | A * | 5/1995 | Colvard | E21B 21/10 |
| | | | | 137/71 |
| 6,622,795 | B2 * | 9/2003 | Hebert | E21B 21/10 |
| | | | | 137/515.7 |
| 6,666,273 | B2 | 12/2003 | Laurel | |
| 7,527,104 | B2 | 5/2009 | Branch | |
| 10,435,984 | B2 | 10/2019 | Mericas | |
| 10,724,648 | B2 | 7/2020 | Mericas | |
| 2003/0098163 | A1 * | 5/2003 | Hebert | E21B 21/10 |
| | | | | 166/381 |
| 2019/0264512 | A1 | 8/2019 | Stair | |
| 2020/0040702 | A1 * | 2/2020 | Stone | E21B 43/25 |
| 2023/0069930 | A1 * | 3/2023 | Arsoski | F16K 27/0209 |
| 2023/0399899 | A1 * | 12/2023 | Mackay | E21B 17/16 |

\* cited by examiner

DUAL FLOW CONVERTED AUTO-FILL FLOAT VALVE

BACKGROUND OF THE DISCLOSURE

Field of the Disclosure

The present disclosure generally relates to a dual flow converted auto-fill float valve.

Description of the Related Art

U.S. Pat. No. 3,051,246 discloses subsurface well bore equipment and more particularly an apparatus for automatically filling a conduit string as it is being lowered through fluid in a well bore.

U.S. Pat. No. 3,385,372 discloses a valve for limiting the rate of fill-up as a casing string is lowered in a bore hole. The valve is converted to a back pressure valve by pumping fluid down the casing to break a frangible link within the valve.

U.S. Pat. No. 3,776,250 discloses a valved collar for allowing a pipe string to fill up as it is lowered in a bore hole while controlling the rate of fill up through a differential fill feature, utilizing a valve plunger in a valve body with the plunger opening against spring means and having an elastomeric collar intermediately located on the plunger shaft for allowing fill up to occur above a predetermined differential pressure.

U.S. Pat. No. 4,625,762 discloses an auto-fill flow valve for use in providing valving action in a conduit, the valve having a releasable locking mechanism which prevents the valving element from moving to seat against the valve seat until the locking mechanism is released. Also provided is a valve guide for receiving the releasable locking mechanism and holding it against the valving element.

U.S. Pat. No. 4,683,955 discloses an automatic fill-up floating apparatus usable in a float collar or a float shoe in a casing string. The apparatus includes a housing having a back check valve positioned therein. A spring biases the valve toward a closed position. A filling body is disposed across an opening at a lower end of the housing and includes a flow passage therethrough. The filling body is shearably pinned to a valve stem extending from the valve and has a holding position in which the valve is held in an open position. A resilient washer is annularly positioned around the valve stem and above the filling body. The washer is free to move upwardly in response to upward movement of flow through the flow passage in the filling body as the casing string is lowered into a well. The floating apparatus may be tripped by pumping fluid downwardly through the casing strings such that the washer is forced against the filling body, sealingly covering the flow passage therethrough. When there is sufficient differential pressure across the washer and filling body, the shear pin will be sheared such and the body released from the valve stem. Thereafter, the spring will be free to move the valve to a closed position when downward fluid flow drops sufficiently.

U.S. Pat. No. 5,411,049 discloses a valve body within which is mounted a stem support; a plunger with a stem which is movably mounted for movement in the stem support to move a rounded head of the plunger to sealingly contact a sealing surface within the valve body thereby preventing flow through the valve; a piston recess in the stem which receives and holds a top portion of a piston; the piston (or some part connected thereto or formed integrally thereof) held immobile by one or more holding devices (e.g. bars, plates, pins, rods, etc.) which, in one embodiment extend through the piston and into the stem support or into a piston housing and which are frangible, erodible, degradable or destroyable either by action of a hydrostatic head of fluid on a bottom surface of the piston or by chemical or thermal attack and degradation.

U.S. Pat. No. 6,622,795 discloses a flow-actuated valve for use in a wellbore. The valve includes a body having a closing member and a seat. The closing member and seat are separable to open and close the valve, thereby allowing the flow of fluid through the valve. The valve further includes a retainer to initially retain the valve in the open position absent a predetermined fluid flow rate in a first direction for a predetermined time period. A biasing member thereafter urges the valve to the closed position, absent another fluid flow rate in the first direction.

U.S. Pat. No. 6,666,273 discloses a plunger-type valve for use in a wellbore. The plunger-type valve is arranged to selectively allow fluid flow to enter and exit the valve in both directions. Subsequently, the plunger-type valve can be deactivated to selectively allow fluid flow in only one direction. The valve includes a body, at least one locking segment, a locking sleeve, at least one biasing member, a valve seat and a plunger.

U.S. Pat. No. 7,527,104 discloses a valve for a well pipe, the valve having the following parts: a valve collar connectable to the well pipe; an index piston coaxially positioned within the valve collar for longitudinal translation within the valve collar between closed, flow-open, and locked-open configurations; a detent in the index piston, wherein the detent restricts fluid flow in a circulation direction through a flow path through the index piston; a spring that biases the index piston toward the closed and locked-open configurations; and a plug of the valve collar that mechanically communicates with the index piston to be in corresponding closed, flow-open, and locked-open configurations.

U.S. Pat. No. 10,435,984 discloses a float valve including a selection mechanism having an open configuration in which flow into and out of the valve is permitted, and a closed configuration in which flow out of the valve is permitted and flow into the valve is prevented. The selection mechanism can be actuated from the closed configuration to the open configuration. Also disclosed is a method of actuating a float valve including actuating the valve from a closed configuration in which flow into the valve is prevented but flow out of the valve is permitted, to an open configuration in which flow into and out of the valve is permitted. The valve can actuate from the open configuration to the closed configuration, and from the closed to the open configuration, in response to a flow rate through the valve being greater than a predetermined level.

US 2019/0264512 discloses a poppet valve having an elongated tubular housing and an internal bore. A flange extends within the internal bore supporting an interior tubular member. The interior tubular member itself has a central aperture and an inwardly protruding lip extending into the central aperture. A stem having collet fingers may be partially received in the central aperture of the interior tubular member. The collet fingers have a protrusion which is engagable with the inwardly protruding lip. A biasing element is provided biasing the stem toward a first position. An elastomeric seal may be disposed around the stem. When the stem is in a first position the elastomeric seal forms a fluid tight seal preventing fluid flow through the internal bore, and wherein upon application of a predetermined fluid pressure the stem transitions from the first position to a second position, whereby fluid flow is permitted through the internal bore.

SUMMARY OF THE DISCLOSURE

The present disclosure generally relates to a dual flow convertible auto-fill float valve. In one embodiment, a flow-actuated valve for use in a wellbore includes: a body; a poppet movable relative to the body between an open position and a closed position; a spring biasing the poppet toward the closed position; and a shifter having a drogue and a detent engaged with a detent profile of the poppet and a locking receptacle of the body when in an auto-fill mode, thereby keeping the poppet in a partially open position. The valve is operable to shift to a float mode in response to a first flow rate moving the poppet toward the open position to disengage the detent from the locking receptacle and a second flow rate imparting a drag force on the drogue sufficient to disengage the detent from the detent profile. The second flow rate is different than the first flow rate.

In another embodiment, a method for deploying a caser or liner string into a wellbore includes: lowering the casing or linger string into the wellbore, the casing or liner string having a partially open valve assembled as a part thereof; pumping fluid down a bore of the casing or liner string at a first flow rate; increasing the pumping of the fluid to a second flow rate, thereby shifting the valve from an auto-fill mode to a float mode; and pumping cement slurry through the bore of the casing or liner string and into an annulus formed between the casing or liner string and the wellbore. The valve closes in response to halting the pumping of the cement slurry, thereby keeping the cement slurry in the annulus

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
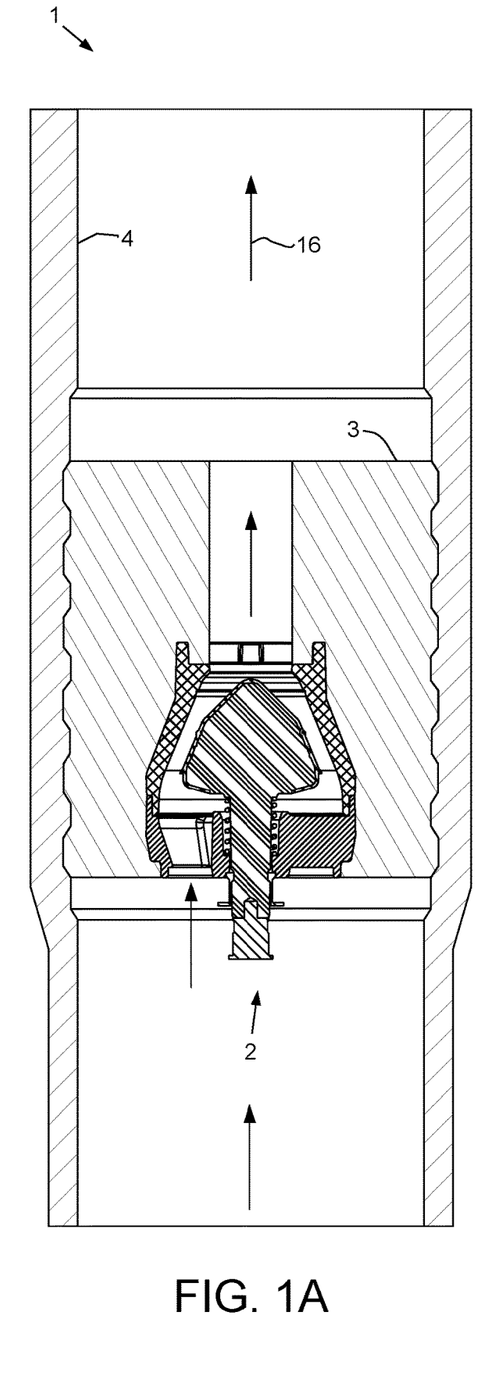
FIG. 1A illustrates a float collar having the dual flow convertible auto-fill float valve (DFCAFFV), according to one embodiment of the present disclosure.

FIG. 1A illustrates a float collar 1 having the dual flow converted auto-fill float valve (DFCAFFV) 2, according to one embodiment of the present disclosure. The float collar 1 may include the DFCAFFV 2, a sheath 3, and a housing 4. The housing 4 may be tubular and may have a coupling (not shown) formed at each longitudinal end thereof, such as a threaded pin or box, for assembly as part of a casing or liner string (not shown). The float collar 1 may be assembled at a lower portion of the casing or liner string. The housing 4 may have an array of groves formed in and along an inner surface thereof to facilitate bonding with the sheath 3. The housing 4 may be made from a metal or alloy, such as steel. The DFCAFFV 2 and sheath 3 may be made from materials drillable by a polycrystalline diamond compact (PDC) drill bit.

The sheath 3 may be made from cement, such as Portland cement or Portland cement concrete. The sheath 3 may bond the DFCAFFV 2 to the inner surface of the housing 4 within a flow bore thereof. The sheath 3 may also seal an interface between the DFCAFFV 2 and the housing 4 to prevent fluid bypass of the DFCAFFV. The sheath 3 may surround the DFCAFFV 2 and have a flow bore formed through a portion thereof and in fluid communication with an upper end port of the DFCAFFV and with the flow bore of the housing 4. The DFCAFFV 2 may be located in a lower portion of the sheath 3 such that one or more lower end ports of the DFCAFFV are exposed to the flow bore of the housing 4. A top of the sheath 3 may serve as a landing shoulder for a wiper plug (not shown).

Alternatively, the DFCAFFV 2 may be used in a float shoe, reamer shoe, or casing bit instead of the float collar 1.

Figure 1B:
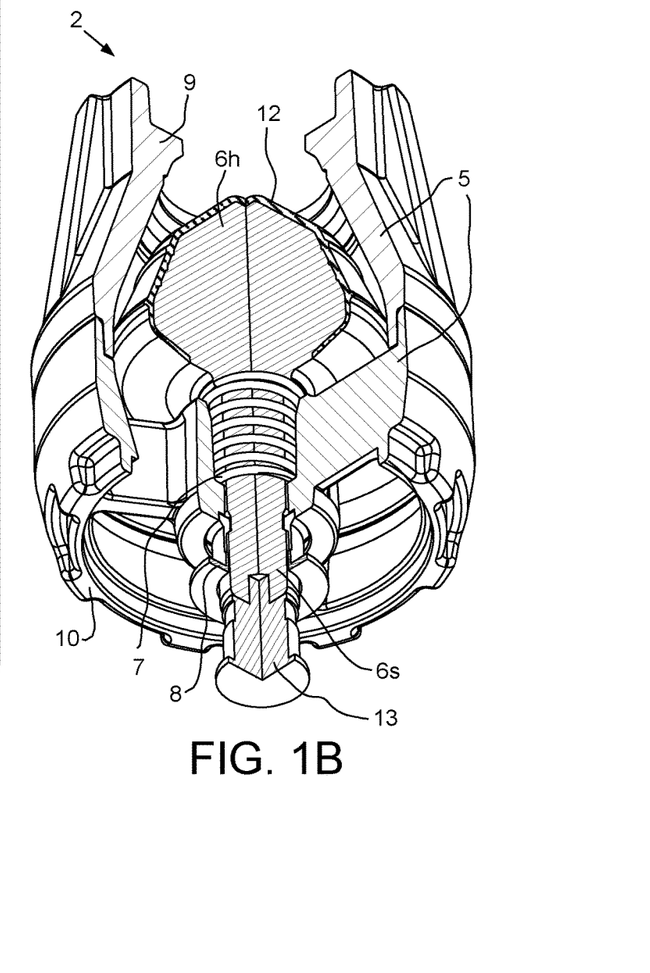
FIG. 1B illustrates the DFCAFFV in the auto-fill mode.
Figure 2A:
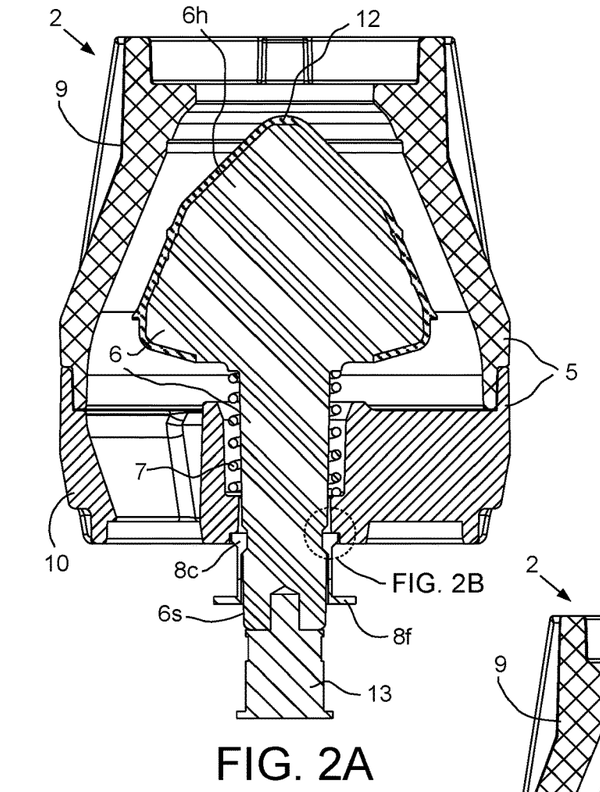
FIG. 2A illustrates the DFCAFFV in the auto-fill mode.
Figure 2B:
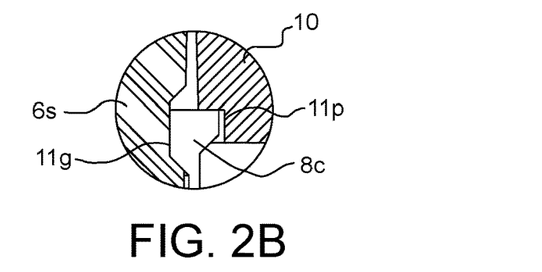
FIG. 2B is an enlargement of a portion of FIG. 2A.

FIGS. 1B and 2A illustrates the DFCAFFV 2 in the auto-fill mode. FIG. 2B is an enlargement of a portion of FIG. 2A. The DFCAFFV 2 may include a body 5, a valve member, such as a poppet 6 (a.k.a. plunger), a biasing member, such as compression spring 7, and a shifter 8. The body 5 may be made from a polymer, such as a thermoplastic, thermoset, or copolymer. The body 5 may include an upper section 9 and a lower section 10 which may be connected together by a lap joint and secured, such as by adhesive or threads. The poppet 6 may have an upper head portion 6*h* and a lower stem portion 6*s*.

The upper body section 9 may be frusto-conical and have a valve chamber formed therein for receiving the poppet head 6*h*. An outer surface of the upper body section 9 may have recesses formed therein to facilitate bonding with the sheath 3 in a torsional manner. An inner shoulder may be formed adjacent a top of the upper body section 9 to facilitate bonding with the sheath 3 in a longitudinal manner. The upper end port of the DFCAFFV 2 may be formed adjacent the top of the upper body section 9 and may be in fluid communication with the valve chamber. The valve chamber may extend from the upper end port of the DFCAFFV 2 along an inner surface of the upper body section 9 and through to a lower end thereof. The valve chamber may diverge from the upper end port of the DFCAFFV 2 to a lower end of the upper body section 9 except for straight portions at the interfaces with the upper end port and the lower end.

The lower body section 10 may have a plurality of portions, such as an outer rim, an inner hub, and one or more (two shown) ribs connecting the rim and the hub. The lower end ports of the DFCAFFV 2 may be formed between the ribs of the lower body section 10 and may be in fluid communication with the valve chamber. An outer surface of the lower body section 9 may have recesses formed therein adjacent to a bottom thereof to facilitate bonding with the sheath 3 in a longitudinal and torsional manner. The hub of the lower body section 10 may have a passage formed therethrough for receiving the poppet stem 6s. A spring chamber may be formed in an upper portion of the hub of the lower body section 10 adjacent to the passage for receiving the spring 7. A spring shoulder may be formed at a bottom of the spring chamber of the lower body section 10. A locking receptacle 11p may be formed in a bottom of the hub of the lower body section 10 adjacent to the passage.

Figure 3A:
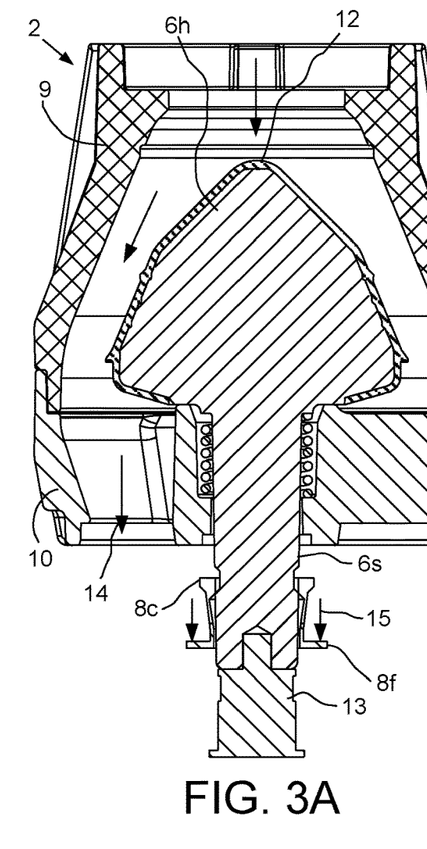
FIG. 3A illustrates shifting of the DFCAFFV from the auto-fill mode to the float valve mode.
Figure 3B:
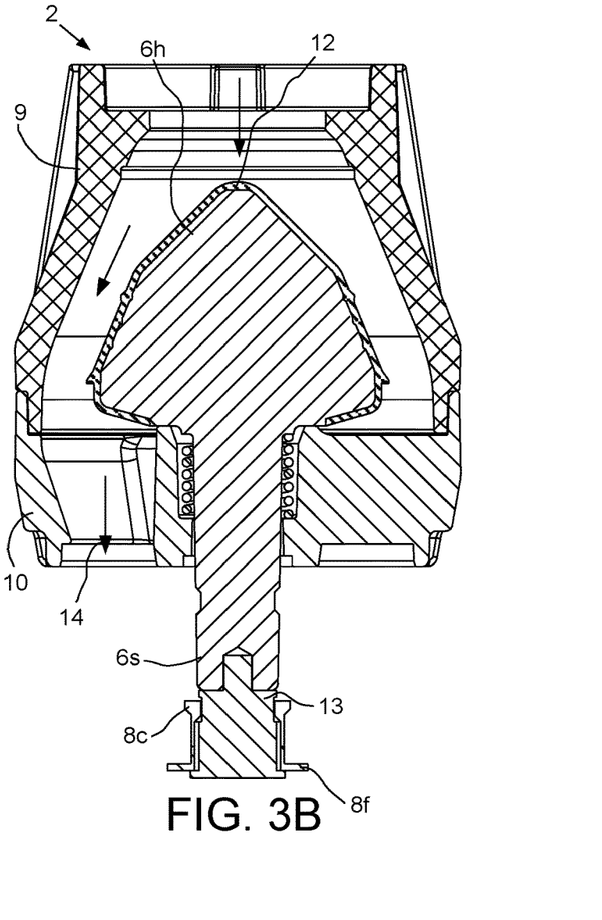
FIG. 3B illustrates the DFCAFFV in the float-valve mode at a fully open position.

The poppet 6 may be made from any of the materials of the body 5, discussed above. The poppet head 6h may be conical and may carry a valve seal 12 on an outer surface thereof. The valve seal 12 may be made from an elastomer or elastomeric copolymer and may be mounted to the poppet head, such as by being molded thereon. In the auto-fill mode, the poppet 6 may be longitudinally movable relative to the body 5 between a partially open position (shown) and a fully open position (FIGS. 3A and 3B). The poppet head 6h may have a stop shoulder formed in a bottom thereof and a spring shoulder formed at an interface with the poppet stem 6s. In the fully open position, the stop shoulder of the poppet head 6h may engage a top of the hub of the lower body section 10.

Figures 4A, 4B, 4C, 4D:
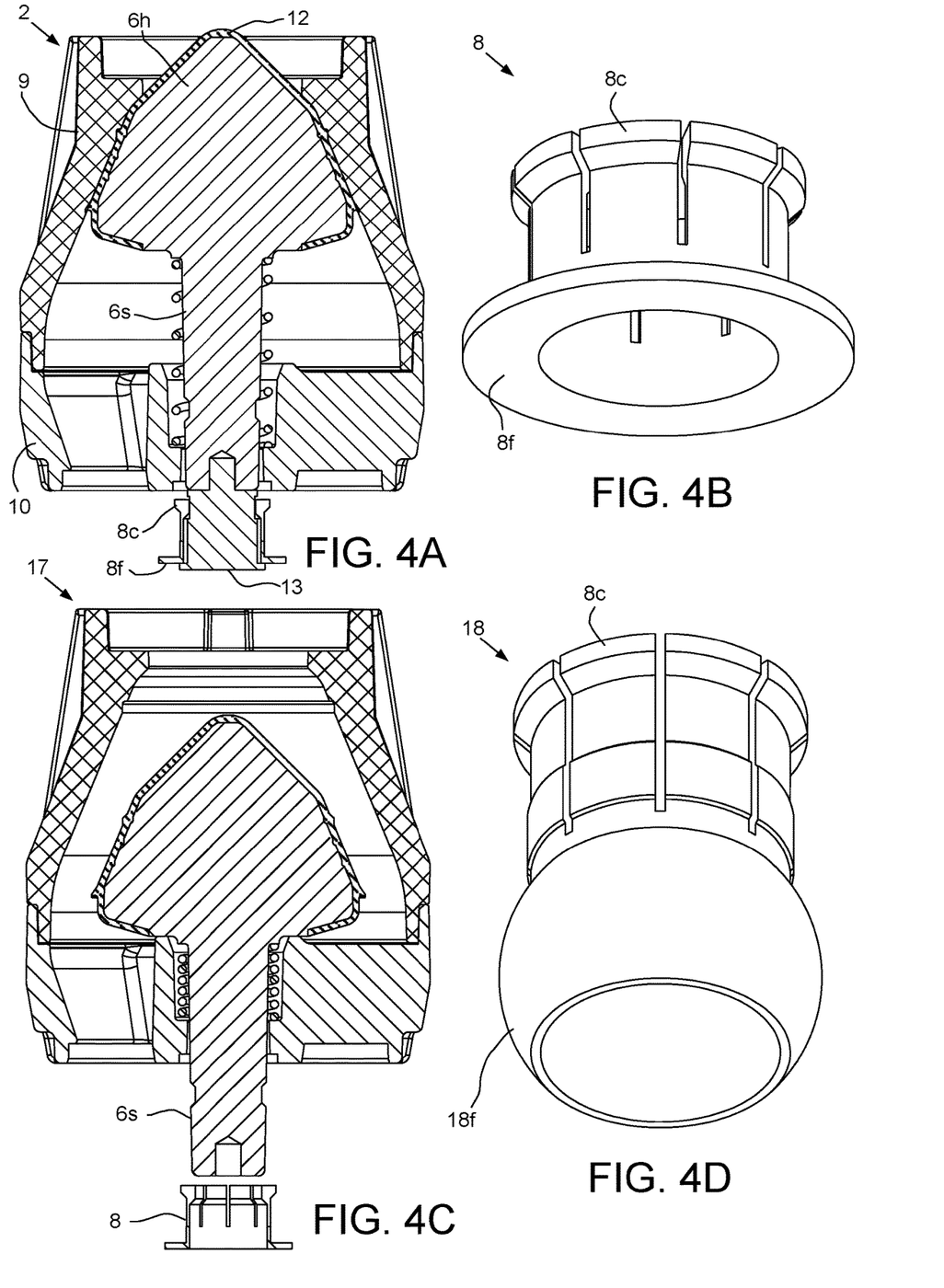
FIG. 4A illustrates the DFCAFFV in the float-valve mode at a closed position.
FIG. 4B illustrates the shifter of the DFCAFFV.
FIG. 4C illustrates an alternative DFCAFFV, according to another embodiment of the present disclosure.
FIG. 4D illustrates a first alternative shifter for use with the DFCAFFV, according to another embodiment of the present disclosure.

The spring 7 may have an upper end bearing against the spring shoulder of the poppet head 6h and a lower end bearing against the spring shoulder of the hub of the lower body section 10, thereby biasing the poppet 6 toward a closed position (FIG. 4A). The spring 7 may be made from a non-ferrous metal or alloy. By nonferrous, it is meant that the material contains no more than a trace amount of iron. The poppet stem 6s may extend through the hub passage of the lower body section 10. A portion of the hub passage between the spring chamber and the locking receptacle 11p may serve as a guide for the poppet stem 6s and a clearance fit, such as a sliding fit or close running fit, may be formed between an outer surface of the poppet stem and the inner surface of the hub of the lower body section 10.

Alternatively, any of the components of the DFCAFFV 2 except the valve seal 12 may be made from any of the materials discussed above for the spring 7. Alternatively, the sheath 3 may be omitted and the body 5 may extend to the inner surface of the housing 4 and be connected thereto.

The poppet stem 6s may have a detent profile, such as groove 11g, formed in an outer surface thereof for receiving the shifter 8. The poppet stem 6s may have a socket formed therein and extending from a bottom thereof. A peg of a retainer 13 may be disposed in the socket, thereby connecting the retainer and the poppet 6, and the connection may be secured by adhesive or threads. The retainer 13 may have a keeper groove formed in an outer surface thereof adjacent to an interface with the poppet stem 6s and a stop shoulder formed therein adjacent to a bottom thereof. The retainer 13 and shifter 8 may be made from any of the materials of the body 5, discussed above.

Referring also to FIG. 4B, the shifter 8 may be annular and may have a plurality of portions, such as an upper detent and a lower drogue. The upper detent may be a collet 8c and the lower drogue may be a flange 8f. The collet 8c may include a base ring and a plurality (five shown) of split fingers extending longitudinally from the base. The fingers may have lugs formed at an end distal from the base. The fingers may be cantilevered from the base and have a stiffness biasing the fingers toward a natural position (shown) where the finger lugs are engaged with the detent groove 11g, thereby longitudinally fastening the shifter 8 to the poppet 6. Each collet finger may have an angled cam surface formed at an interface between the finger and the respective lug to interact with an angled cam surface of the detent profile 11g. The locking receptacle 11p may include a stop shoulder for engaging a top of the finger lugs and an inner surface sized to entrap the finger lugs from expanding to disengage the detent groove 11g. The finger lugs may also protrude sufficiently to engage the stop shoulder of the locking receptacle 11p, thereby propping the poppet 6 in the partially open position by preventing the spring 7 from moving the poppet longitudinally to the closed position. The drogue flange 8f may extend radially from the outer surface of the collet base such that an upper face thereof is perpendicular to downward flow of conditioner fluid 14 (FIG. 2C) in the housing bore and through the DFCAFFV 2, thereby creating a hydrodynamic drag force 15 (FIG. 3A) for moving the shifter 8 from the auto-fill position (shown) to a float position (FIG. 3B). The conditioner fluid 14 may be a liquid.

During deployment of the casing or liner string into a wellbore (not shown), wellbore fluid 16 (FIG. 1A) is displaced from the wellbore through a shoe thereof, up a bore of the housing 4, through the open DFCAFFV 2, and upward into a bore of the rest of the casing or liner string. Allowing the bore of the casing string to fill with wellbore fluid 16 mitigates surge pressure that could damage sensitive formations exposed to the wellbore and mitigates obstruction to deployment from buoyancy of the casing or liner sting. The DFCAFFV 2 may be kept in the auto-fill mode by engagement of the shifter 8 with the locking receptacle 11p during lowering of the casing or liner string into the wellbore.

Figure 2C:
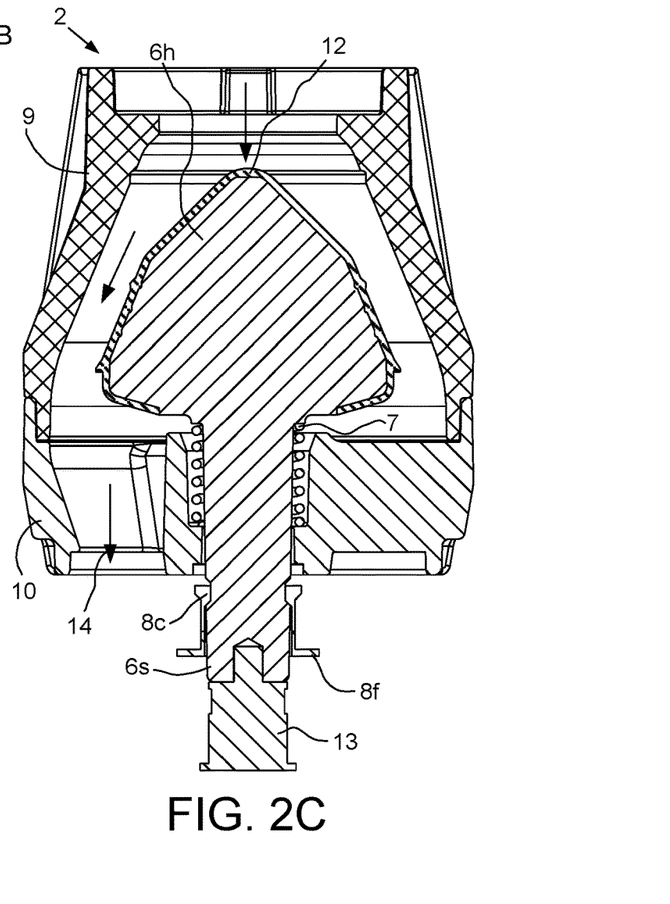
FIG. 2C illustrates shifting of the DFCAFFV from the auto-fill mode to the float valve mode.

FIGS. 2C and 3A illustrate shifting of the DFCAFFV 2 from the auto-fill mode to the float valve mode. Referring specifically to FIG. 2C, once the casing or liner string has landed in the wellbore, the conditioner fluid 14 may be pumped down the bore of the casing or liner string at a first flow rate. The conditioner fluid 14 may be pumped into the casing or liner string via a cementing head (not shown) connected to a top of the casing or liner string at a drilling rig at a surface of the earth or the sea. Pumping of the conditioner fluid 14 at the first flow rate may create a differential pressure across the poppet head 6h due to pressure loss through a restricted valve passage formed between the poppet head and an inner surface of the upper body section 9, thereby creating a net downward pressure force on the poppet 6. The downward pressure force may be sufficient to at least partially overcome the upward biasing force of the spring 7, thereby moving the poppet 6 downward and freeing the shifter 8 from the locking receptacle 11p. Pumping of the conditioner fluid 14 at the first flow rate may create a negligible drag force 15 which may be insufficient to overcome the stiffness of the collet fingers to expand the collet 8c from the detent groove 11g.

Referring specifically to FIG. 3A, to continue shifting of the DFCAFFV 2, pumping of the conditioner fluid 14 down the bore of the casing or liner string may be increased to a second flow rate greater than the first flow rate. The second flow rate may create the drag force 15 which is sufficient to overcome the stiffness of the collet fingers and expand the collet 8c from the detent groove 11g. The drag force 15 may drive the collet fingers along the cam surface of the detent groove 11g, thereby expanding the collet fingers until an inner diameter of the finger lugs equals the diameter of the poppet stem 6s. The second flow rate may also further increase the net downward force on the poppet 6, thereby further moving the poppet downward until the shoulder of the poppet stem 6s seats on the top of the hub portion of the lower body section 10, thereby fully opening the DFCAFFV 2.

Alternatively, the first flow rate may be sufficient to fully open the DFCAFFV 2. Alternatively, the second flow rate may only further partially open the DFCAFFV 2 instead of fully opening the DFCAFFV.

Alternatively, the drag force 15 generated by the first flow rate may be sufficient to overcome the stiffness of the collet fingers, expand the collet 8c from the detent groove 11g, and snap the shifter 8 longitudinally downward, thereby shifting the DFCAFFV 2 into the float-valve mode. In this alternative, the step of increasing the flow rate to the second flow rate may be omitted and the second flow rate may be less than the first flow rate such that the collet fingers may expand into engagement with the inner surface of the locking receptacle 11p as the flow rate reaches the second flow rate during transitioning from zero to the first flow rate but such engagement prevents the shifter 8 from moving longitudinally downward until the first flow rate is achieved to free the shifter from the locking receptacle.

FIG. 3B illustrates the DFCAFFV 2 in the float-valve mode at a fully open position. Once the collet 8c has been expanded, the drag force 15 may then snap the shifter 8 longitudinally downward along the outer surface of the poppet stem 6s and the retainer 13 until a top of the drogue flange 8f engages the stop shoulder of the retainer. The collet 8c may also snap into the keeper groove of the retainer 13. A stroke of the shifter 8 from the detent groove 11g to the keeper groove of the retainer 13 may be greater than a stroke of the poppet 6 from the fully open position to the closed position such that the shifter may no longer interfere with operation of the poppet.

FIG. 4A illustrates the DFCAFFV 2 in the float-valve mode at a closed position. Once the DFCAFFV 2 has been shifted to the float-valve mode, cement slurry (and wiper plugs) may be pumped through the bore of the casing or liner string until the cement slurry has been pumped into an annulus formed between the casing or liner string and the wellbore. Once the cement slurry has been placed, the DFCAFFV 2 may close to prevent the cement slurry from U-tubing back into the bore of the casing or liner string. The lack of any downward pumping through the DFCAFFV 2 may remove any pressure differential across the poppet 6, thereby allowing the spring 7 to move the poppet upwardly until the valve seal 12 carried by the poppet head 6h engages a mating valve seat formed in an inner surface of the upper housing section 9, thereby sealing the valve chamber of the DFCAFFV 2 from upward flow there-through. Once the cement slurry has cured, the DFCAFFV 2 and sheath 3 may be drilled out such that the wellbore may be further extended.

Advantageously, requiring flow to shift the DFCAFFV 2 from the auto-fill mode to the float-valve mode mitigates likelihood of premature shifting of the DFCAFFV 2 during deployment of the casing or liner string into the wellbore. Such premature shifting could otherwise be caused by bump pressures, flow vibration, flow slugs, or lost circulation materials. Additionally, requiring flow to shift the DFCAFFV 2 from the auto-fill mode to the float-valve mode mitigates likelihood of premature shifting of the DFCAFFV 2 during transport of the DFCAFFV 2 to the wellsite. Such premature shifting could otherwise be caused by vibration or jarring during transportation and/or storage.

FIG. 4C illustrates an alternative DFCAFFV 17, according to another embodiment of the present disclosure. The alternative DFCAFFV 17 may be similar or identical to the DFCAFFV 2 except for omission of the retainer 13. Instead of the shifter 8 engaging the retainer 13, the shifter may separate from the rest of the alternative DFCAFFV 17 and be ejected from the poppet stem 6s into the bore of the housing 4. If the alternative DFCAFFV 17 is part of the float collar 1, the shifter 8 may fall from the housing bore and come to rest on the reamer shoe or casing bit of the casing or liner sting. If the alternative DFCAFFV 17 is part of a float shoe, the alternative DFCAFFV 17 may be ejected into the wellbore.

Alternatively, the poppet 6, valve seat, and shifter 8 may be inverted such that the poppet stem 6s is located above the poppet head 6 instead of below the poppet head, as it is for the DFCAFFVs 2, 17.

FIG. 4D illustrates a first alternative shifter 18 for use with the DFCAFFV 2, according to another embodiment of the present disclosure. The first alternative shifter 18 may be annular and may have a plurality of portions, such as the upper collet 8c, and the lower drogue, such as a truncated ball 18f, instead of the flange 8f. The first alternative shifter 18 may be made from any of the materials discussed above for the shifter 8. The first alternative shifter 18 may be used with either DFCAFFV 2, 17 instead of the shifter 8.

Figures 5A, 5B, 5C, 5D:
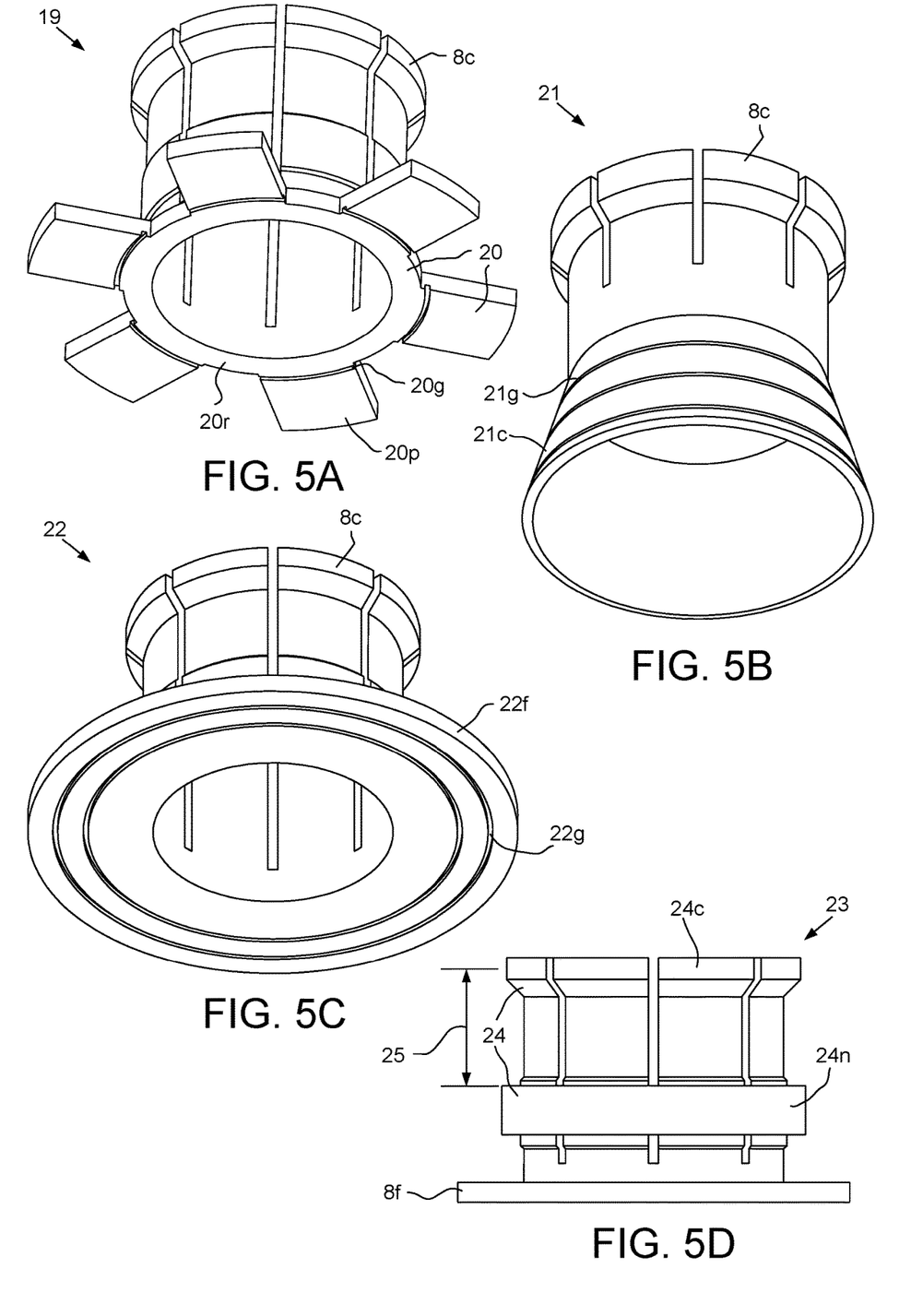
FIG. 5A illustrates a second alternative shifter for use with the DFCAFFV, according to another embodiment of the present disclosure.
FIG. 5B illustrates a third alternative shifter for use with the DFCAFFV, according to another embodiment of the present disclosure.
FIG. 5C illustrates a fourth alternative shifter for use with the DFCAFFV, according to another embodiment of the present disclosure.
FIG. 5D illustrates a fifth alternative shifter for use with the DFCAFFV, according to another embodiment of the present disclosure.
Figures 6A, 6B, 6C, 6D:
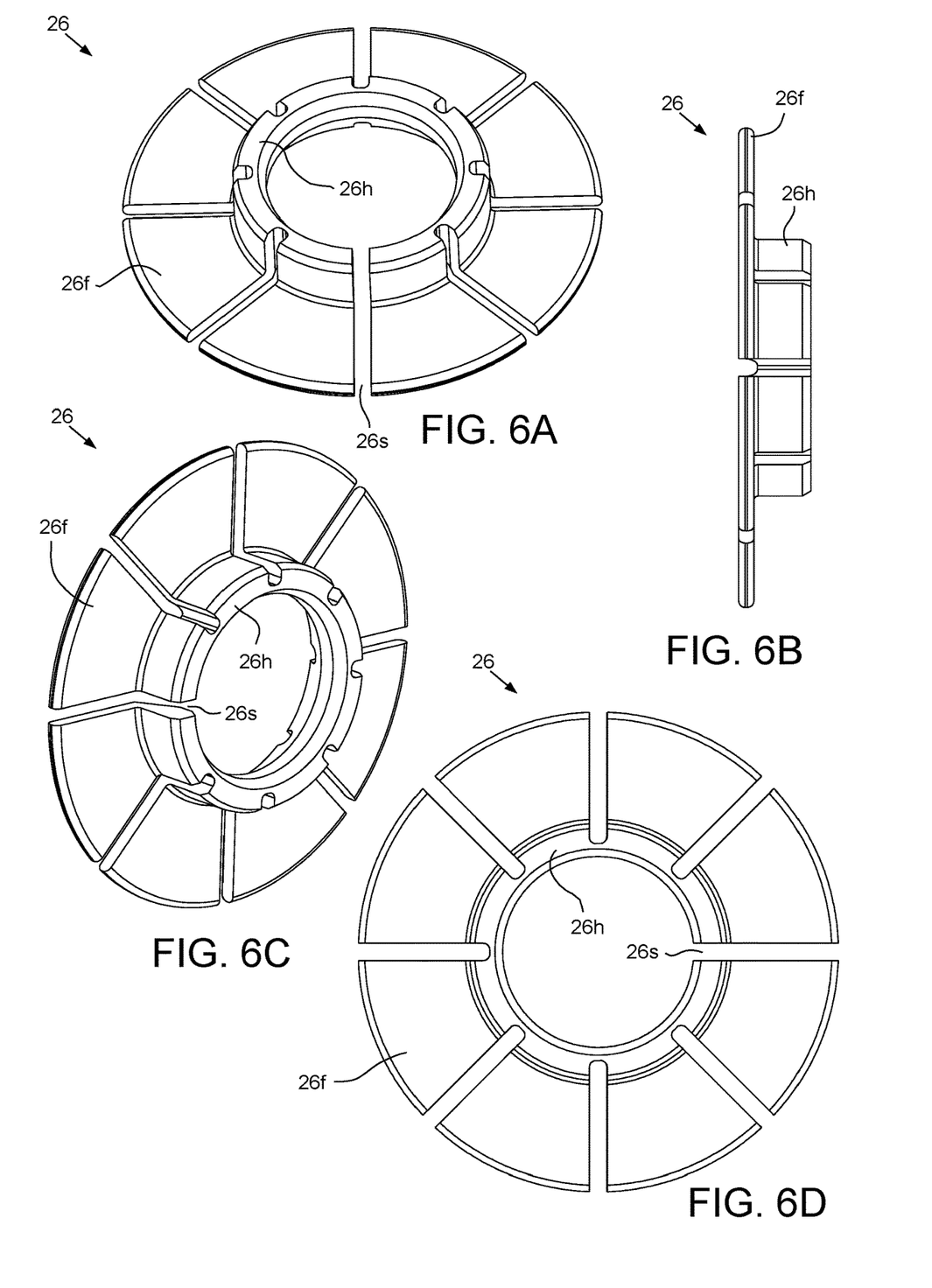
FIGS. 6A-6D illustrate a sixth alternative shifter for use with the DFCAFFV, according to another embodiment of the present disclosure.

FIG. 5A illustrates a second alternative shifter 19 for use with the DFCAFFV 2, according to another embodiment of the present disclosure. The second alternative shifter 19 may be annular and may have a plurality of portions, such as the upper collet 8c, and an adjustable lower drogue, such as a split flange 20, instead of the flange 8f. The split flange 20 may include a base ring 20r and a plurality of flange segments or petals 20p. The petals 20p may each extend outward from the base ring 20r and may be spaced therearound. An interface between each petal 20p and the base ring 20r may be pre-weakened, such as by a groove 20g, formed in a bottom thereof. The second alternative shifter 19 may be made from any of the materials discussed above for the shifter 8. The second alternative shifter 19 may be used with either DFCAFFV 2, 17 instead of the shifter 8. For the DFCAFFVs 2, 17 equipped with the second alternative shifter 19, the second flow rate may be increased by removing or effectively removing one or more of the petals 20p by snapping off, cutting, or bending the desired petals at the respective grooves 20g. By removing or deforming the petals 20p from the flow path, the second flow rate necessary to create the drag force 15 is increased due to the reduced flow area upon which the conditioner fluid 14 is acting.

FIG. 5B illustrates a third alternative shifter 21 for use with the DFCAFFV 2, according to another embodiment of the present disclosure. The third alternative shifter 21 may be annular and may have a plurality of portions, such as the upper collet 8c, and an adjustable lower drogue, such as a frusto-cone 21c, instead of the flange 8f. The frusto-cone 21c may be pre-weakened at a plurality of locations there-along, such as by grooves 21g, formed in an outer surface thereof. The third alternative shifter 21 may be made from any of the materials discussed above for the shifter 8. The third alternative shifter 21 may be used with either DFCAFFV 2, 17 instead of the shifter 8. For the DFCAFFVs 2, 17 equipped with the third alternative shifter 21, the second flow rate may be increased by removing one or more portions of the frusto-cone 21c by snapping off or cutting the desired groove 21g. By removing the cone portions, the second flow rate necessary to create the drag force 15 is increased due to the reduced length and diameter of the remaining frusto-cone 21c upon which the conditioner fluid 14 is acting.

FIG. 5C illustrates a fourth alternative shifter 22 for use with the DFCAFFV 2, according to another embodiment of the present disclosure. The fourth alternative shifter 22 may be annular and may have a plurality of portions, such as the upper collet 8c, and an adjustable lower drogue, such as a flange 22f, instead of the flange 8f. The flange 22f may be pre-weakened at a plurality of circumferential locations there-around, such as by grooves 22g, formed in a bottom thereof. The fourth alternative shifter 22 may be made from any of the materials discussed above for the shifter 8. The fourth alternative shifter 22 may be used with either DFCAFFV 2, 17 instead of the shifter 8. For the DFCAFFVs 2, 17 equipped with the fourth alternative shifter 22, the second flow rate may be increased by removing one or more portions of the flange 22f by snapping off or cutting the desired groove 22g. By removing the flange portions, the second flow rate necessary to create the drag force 15 is increased due to the reduced diameter of the remaining flange 22f upon which the conditioner fluid 14 is acting.

FIG. 5D illustrates a fifth alternative shifter 23 for use with the DFCAFFV 2, according to another embodiment of the present disclosure. The fifth alternative shifter 23 may be annular and may have a plurality of portions, such as an upper adjustable detent 24, and a lower drogue, such as the flange 8f. The adjustable detent 24 may include a collet 24c and a nut 24n. The collet 24c may include a base ring and a plurality (four shown) of split fingers extending longitudinally from the base. The fingers may have lugs formed at an end distal from the base. The fingers may be cantilevered from the base and have a stiffness biasing the fingers toward a natural position (shown). Each collet finger may have an angled cam surface formed at an interface between the finger and the respective lug. A portion of each finger adjacent to the base may have a portion of a threaded outer surface and the nut 24n may be screwed onto the threaded outer surface collectively formed by the portions. The nut 24n may be rotated along the threaded outer surface to adjust a cantilevered length 25 of the fingers, thereby varying a stiffness of the collet fingers. The fifth alternative shifter 23 may be made from any of the materials discussed above for the shifter 8. The fifth alternative shifter 23 may be used with either DFCAFFV 2, 17 instead of the shifter 8. For the DFCAFFVs 2, 17 equipped with the fifth alternative shifter 23, the second flow rate may be increased by adjusting the nut 24n to shorten the length (and vice versa). By shortening the length, the drag force 15 required to release the collet 24c is increased due to the increased stiffness of the collet fingers, thereby requiring a greater second flow rate (and vice versa).

Alternatively, the drogue of the fifth alternative shifter 23 may be the truncated ball 18f instead of the flange 8f.

FIGS. 6A-6D illustrate a sixth alternative shifter 26 for use with the DFCAFFV 2, according to another embodiment of the present disclosure. The sixth alternative shifter 26 may be used with either DFCAFFV 2, 17 instead of the shifter 8. The sixth alternative shifter 26 may be made from any of the materials discussed above for the shifter 8. The sixth alternative shifter 26 may be annular and may have a plurality of portions, such as an upper detent, and a lower drogue. The upper detent may be a split hub 26h and the lower drogue may be a split flange 26f. A slot 26s may extend through a wall of the split hub 26h and the split flange 26f to facilitate movement of the sixth alternative shifter 26 from a natural (contracted) position (shown) to an expanded position (not shown). The split hub 26h may include a plurality (eight shown) of partially split lugs extending there-around and the split flange 26f may include a plurality (eight shown) of split petals. Each petal may extend radially outward from a bottom of the respective lug. The split hub 26h may have an angled cam surface formed along an inner surface thereof, thereby forming an upper portion having a reduced inner diameter and a lower portion having an increasing inner diameter from the upper portion. The split hub 26h may have a stiffness biasing the lugs toward the natural position where an upper portion of the lugs are engaged with the detent groove 11g, thereby longitudinally fastening the shifter 8 to the poppet 6. The cam surface may interact with the angled cam surface of the detent profile 11g. A top of the lugs may also protrude sufficiently to engage the stop shoulder of the locking receptacle 11p, thereby propping the poppet 6 in the partially open position by preventing the spring 7 from moving the poppet longitudinally to the closed position. Once a sufficient drag force 15 is exerted on the split flange 26f, interaction of the cam surfaces may expand the upper portions of the lugs until an inner diameter of the upper portion of the lugs equals the diameter of the poppet stem 6s.

Alternatively, each petal of the split flange 26f may be pre-weakened to provide adjustability.

While the foregoing is directed to embodiments of the present disclosure, other and further embodiments of the disclosure may be devised without departing from the basic scope thereof, and the scope of the invention is determined by the claims that follow.

The invention claimed is:

1. A flow-actuated valve for use in a wellbore, comprising:
   a body;
   a poppet movable relative to the body between an open position and a closed position;
   a spring biasing the poppet toward the closed position; and
   a shifter having a drogue and a detent engaged with a detent profile of the poppet and a locking receptacle of the body when in an auto-fill mode, thereby keeping the poppet in a partially open position,
   wherein:
      the valve is operable to shift to a float mode in response to a first flow rate moving the poppet toward the open position to disengage the detent from the locking receptacle and a second flow rate imparting a drag force on the drogue sufficient to disengage the detent from the detent profile, and
      the second flow rate is different than the first flow rate.

2. The flow-actuated valve of claim 1, wherein the shifter is adjustable.

3. The flow-actuated valve of claim 2, wherein:
   the drogue is a split flange having a plurality of petals, and each petal is pre-weakened to facilitate removal of a desired one or more petals.

4. The flow-actuated valve of claim 2, wherein:
   the drogue is a frusto-cone,
   the frusto-cone is pre-weakened at a plurality of locations along an outer surface thereof to facilitate removal of a desired one or more portions thereof.

5. The flow-actuated valve of claim 2, wherein:
   the drogue is a flange,
   the flange is pre-weakened at a plurality of circumferential locations there-around to facilitate removal or deformation of a desired one or more portions thereof.

6. The flow-actuated valve of claim 2, wherein:
the detent comprises a collet and a nut,
the collet has a base and a plurality of split fingers extending longitudinally from the base,
a portion of each finger has a portion of a threaded outer surface, and
the nut is screwed onto the threaded outer surface collectively formed by the portions.

7. The flow-actuated valve of claim 1, wherein the drogue is a flange.

8. The flow-actuated valve of claim 1, wherein the drogue is a truncated ball.

9. The flow-actuated valve of claim 1, wherein:
the body has a chamber formed therein and a hub adjacent to the chamber,
the poppet has a head disposed in the chamber and a stem extending through the hub,
the spring is disposed between the body and the poppet,
the detent profile is formed in the stem, and
the locking receptacle is formed in the hub.

10. The flow-actuated valve of claim 1, wherein the second flow rate is greater than the first flow rate.

11. The flow-actuated valve of claim 1, wherein:
the detent is a split hub having a plurality of partially split lugs, and
the drogue is a split flange having a plurality of petals.

12. A float collar, comprising:
at least one flow-actuated valve of claim 1;
a tubular housing for assembly as part of a casing or liner string; and
a sheath bonding the flow-actuated valve to an inner surface of the housing within a flow bore thereof,
wherein the flow-actuated valve and the sheath are made from materials drillable by a polycrystalline diamond compact (PDC) drill bit.

13. A float shoe, comprising:
at least one flow-actuated valve of claim 1;
a tubular housing for assembly onto a bottom part of a casing or liner string; and
a sheath bonding the flow-actuated valve to an inner surface of the housing within a flow bore thereof,
wherein the flow-actuated valve and the sheath are made from materials drillable by a polycrystalline diamond compact (PDC) drill bit.

14. A method for deploying a caser or liner string into a wellbore, comprising:
lowering the casing or linger string into the wellbore, the casing or liner string having a partially open valve assembled as a part thereof, wherein: the valve includes a body, a poppet, a shifter, and a spring biasing the poppet toward a seat of the body, and engagement of the shifter with the body locks the shifter to the poppet, thereby keeping the valve partially open;
pumping a fluid down a bore of the casing or liner string at a first flow rate, wherein pumping the fluid at the first flow rate further opens the valve and frees the shifter from the body;
increasing the pumping of the fluid to a second flow rate, thereby shifting the valve from an auto-fill mode to a float mode; and
pumping cement slurry through the bore of the casing or liner string and into an annulus formed between the casing or liner string and the wellbore,
wherein the valve closes in response to halting the pumping of the cement slurry, thereby keeping the cement slurry in the annulus.

15. The method of claim 14, wherein increasing the pumping of the fluid to the second flow rate exerts a drag force on the shifter, thereby moving the shifter along the poppet.

* * * * *